(12) United States Patent
Rutschmann et al.

(10) Patent No.: US 8,991,177 B2
(45) Date of Patent: Mar. 31, 2015

(54) INTERNAL COMBUSTION ENGINE

(75) Inventors: Erwin Rutschmann, Tiefenbronn (DE); Willi Schultz, Neulingen (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 681 days.

(21) Appl. No.: 13/276,594

(22) Filed: Oct. 19, 2011

(65) Prior Publication Data
US 2012/0096856 A1 Apr. 26, 2012

(30) Foreign Application Priority Data
Oct. 21, 2010 (DE) .......................... 10 2010 060 106

(51) Int. Cl.
| | |
|---|---|
| *F02B 33/44* | (2006.01) |
| *F02D 23/00* | (2006.01) |
| *F01N 1/00* | (2006.01) |
| *F02B 33/00* | (2006.01) |
| *F01N 13/10* | (2010.01) |
| *F02B 37/00* | (2006.01) |
| *F02B 37/007* | (2006.01) |
| *F02B 37/013* | (2006.01) |
| *F02B 37/02* | (2006.01) |
| *F02D 13/02* | (2006.01) |
| *F01N 13/00* | (2010.01) |

(52) U.S. Cl.
CPC .............. *F02D 23/00* (2013.01); *F01N 13/107* (2013.01); *F02B 37/004* (2013.01); *F02B 37/007* (2013.01); *F02B 37/013* (2013.01); *F02B 37/02* (2013.01); *F02B 37/025* (2013.01); *F02D 13/0242* (2013.01); *F02D 13/0257* (2013.01); *F01N 13/011* (2013.01); *Y02T 10/144* (2013.01); *Y02T 10/18* (2013.01)
USPC .................. 60/612; 60/602; 60/323; 123/562

(58) Field of Classification Search
CPC ...... F02B 37/004; F02B 37/007; F02B 37/02; F02B 37/025; F02B 37/18; F02B 37/22; F01N 13/107; F01N 13/011; F02D 13/0242; F02D 13/0257; F02D 23/00; F02D 2041/001; F02D 2220/40; Y02T 10/144; Y02T 10/18
USPC ...................... 60/612, 602, 320–324; 123/562
See application file for complete search history.

(56) References Cited

U.S. PATENT DOCUMENTS

| | | | | |
|---|---|---|---|---|
| 1,294,475 | A | * | 2/1919 | Kirkham .......................... 60/323 |
| 1,761,960 | A | * | 6/1930 | Sylvester .......................... 60/323 |

(Continued)

FOREIGN PATENT DOCUMENTS

| | | | | |
|---|---|---|---|---|
| CN | 101413423 A | | 4/2009 | |
| DE | 102009060339 A1 | * | 6/2011 | .............. F02B 37/00 |

(Continued)

*Primary Examiner* — Thai Ba Trieu
(74) *Attorney, Agent, or Firm* — RatnerPrestia

(57) ABSTRACT

An internal combustion engine has at least one cylinder group including a plurality of cylinders and at least one exhaust turbocharger, each cylinder including a plurality of outlet valves for exhaust gas, each outlet valve being assigned an outlet duct which opens into an exhaust manifold and via which the respective exhaust gas, after flowing through the respective outlet valve and outlet duct, can be guided in the direction of an exhaust turbocharger, and first outlet ducts of the cylinders being contoured in the manner of nozzles, and second outlet ducts of the cylinders being contoured in the manner of diffusers.

13 Claims, 12 Drawing Sheets

(56) References Cited

U.S. PATENT DOCUMENTS

| | | | |
|---|---|---|---|
| 2,000,722 A * | 5/1935 | Steward | 60/323 |
| 2,370,062 A * | 2/1945 | Mercier | 60/320 |
| 4,662,173 A * | 5/1987 | Wilkinson | 60/323 |
| 5,331,930 A * | 7/1994 | McWhorter | 60/321 |
| 5,782,215 A * | 7/1998 | Engelmann | 123/79 C |
| 5,857,336 A * | 1/1999 | Paul et al. | 60/597 |
| 5,860,278 A * | 1/1999 | Rodenkirch | 60/323 |
| 6,347,619 B1 * | 2/2002 | Whiting et al. | 123/568.12 |
| 7,171,805 B2 * | 2/2007 | Ruehle | 60/323 |
| 7,540,151 B2 * | 6/2009 | Boehm et al. | 60/612 |
| 8,065,878 B2 * | 11/2011 | Vuk | 60/612 |
| 2003/0000211 A1 * | 1/2003 | Drangel et al. | 60/602 |
| 2006/0070382 A1 * | 4/2006 | Karlsson | 60/612 |

FOREIGN PATENT DOCUMENTS

| | | |
|---|---|---|
| FR | 2916226 | 11/2008 |
| GB | 825319 | 12/1959 |

\* cited by examiner

INTERNAL COMBUSTION ENGINE

CROSS-REFERENCE TO RELATED APPLICATION

This U.S. patent application claims priority to German Patent Application DE102010060106.3, filed Oct. 21, 2010, which is incorporated by reference herein in its entirety.

FIELD OF THE INVENTION

The invention relates to an internal combustion engine.

BACKGROUND OF THE INVENTION

Reducing displacement in combination with pressure charging of the internal combustion engine, referred to as "downsizing", has been found to be an effective way of reducing fuel consumption and CO2 emissions from motor vehicles. Significant potential for reducing fuel consumption and CO2 emissions can be created here, especially in conjunction with direct fuel injection. This is achieved especially through reduced internal friction, through a shift in the operating point of the internal combustion engine to higher load ranges and through a reduction in the weight of the internal combustion engine owing to smaller displacements and/or a reduced number of cylinders. Although pressure-charged internal combustion engines are already sufficiently well known in practice, there is a growing requirement for an increase in engine power combined with a further reduction in fuel consumption and CO2 emissions.

SUMMARY OF THE INVENTION

Taking this as a starting point, the invention presented here provides an internal combustion engine with improved exhaust gas pressure charging in order to ensure an increase in power combined with a reduction in fuel consumption and CO2 emissions, particularly in the case where displacement is reduced. More particularly, an internal combustion engine has at least one cylinder group comprising a plurality of cylinders and at least one exhaust turbocharger, each cylinder comprising a plurality of outlet valves for exhaust gas, each outlet valve being assigned an outlet duct which opens into an exhaust manifold and via which the respective exhaust gas, after flowing through the respective outlet valve and outlet duct, can be guided in the direction of an exhaust turbocharger, wherein that first outlet ducts of the cylinders are contoured in the manner of nozzles, and second outlet ducts of the cylinders are contoured in the manner of diffusers. First outlet ducts of the cylinders are contoured in the manner of nozzles, and second outlet ducts of the cylinders are contoured in the manner of diffusers.

By means of the difference in the contouring of the outlet ducts of the cylinders of a pressure-charged internal combustion engine, the exhaust gas pressure charging of the latter can be significantly improved.

Thus, the nozzle-type contouring of the outlet ducts of the cylinders of the pressure-charged internal combustion engine brings about an acceleration and an increase in the momentum of the exhaust gas, leading to an improved response of the exhaust gas pressure charging, especially in part-load operation of the internal combustion engine and in full-load operation of the internal combustion engine in the lower engine speed range of the latter.

Thus, the nozzle-type contouring of the outlet ducts, which bring about an increase in the momentum of the exhaust gas flow, makes it possible to implement pulse pressure charging at a turbine of the respective exhaust turbocharger, leading to a good response of the respective exhaust turbocharger, especially in part-load operation or full-load operation in the lower engine speed range of the internal combustion engine, i.e. at relatively low exhaust gas volumes.

In full-load operation of the internal combustion engine in the medium or high engine speed range, i.e. at relatively large exhaust gas volumes, it is possible to achieve constant-pressure charging at a turbine of the respective exhaust turbocharger by selective activation of those outlet ducts of the cylinders which are contoured in the manner of diffusers, which bring about a slowing down and a reduction in the momentum of the exhaust gas flow. As a result, the shock loading on the turbine of the respective exhaust turbocharger is reduced in order to ensure good, well-balanced exhaust gas turbocharging, even in full-load operation at medium and high engine speeds.

According to an advantageous development of the invention, the first outlet ducts of the cylinders of the or of each cylinder group, which outlet ducts are contoured in the manner of nozzles, each open into a common first exhaust manifold with a relatively small flow cross section, and the second outlet ducts of the cylinders of the or of each cylinder group, which outlet ducts are contoured in the manner of diffusers, each open into a common second exhaust manifold with a relatively large flow cross section. By means of the exhaust manifolds with the different flow cross sections for the exhaust gas, it is possible to achieve a further improvement in exhaust gas pressure charging.

Those outlet valves of the cylinders which interact with the outlet ducts which are contoured in the manner of diffusers, or the outlet ducts which are contoured in the manner of diffusers, or the respective exhaust manifolds into which the outlet ducts which are contoured in the manner of diffusers open are preferably activated or deactivated in accordance with the operating state of the internal combustion engine. Those outlet valves of the cylinders which interact with the outlet ducts which are to contoured in the manner of diffusers, or the outlet ducts which are contoured in the manner of diffusers are preferably activated and/or deactivated in accordance with the operating state of the internal combustion engine according to the ignition sequence of the cylinders.

The selective activation, in accordance with the operating state of the internal combustion engine, of the outlet ducts which are contoured in the manner of diffusers or of the outlet valves which interact with the latter is a particularly preferred means of ensuring good exhaust gas pressure charging of the internal combustion engine over all the operating points of the latter.

Activation or deactivation, on selected cylinders, of the outlet ducts which are contoured in the manner of diffusers or of the outlet valves which interact with the latter is a particularly preferred means of ensuring a smooth transition between the different exhaust gas pressure charging levels in the different operating states without sacrificing any power from the exhaust gas pressure charging.

BRIEF DESCRIPTION OF THE DRAWINGS

Illustrative embodiments of the invention are explained in greater detail with reference to the drawing, without being limited thereto. In the drawing.

DETAILED DESCRIPTION OF THE PREFERRED EMBODIMENTS

The invention described here relates to a pressure-charged internal combustion engine. An internal combustion engine of this kind has at least one cylinder group or cylinder row comprising a plurality of cylinders positioned adjacent to one another or one behind the other in a row or rows. Moreover, an internal combustion engine of this kind has at least one exhaust turbocharger.

It should be mentioned even at this stage that the internal combustion engine according to aspects of the invention can be of in-line construction or V-type construction or W-type construction or horizontally opposed construction. Thus, for example, the invention can be employed on a 4-cylinder in-line engine or on a 6-cylinder horizontally opposed engine or on a V-8 engine. Here, each cylinder group or cylinder row can be assigned at least one separate exhaust turbocharger.

Figure 1:
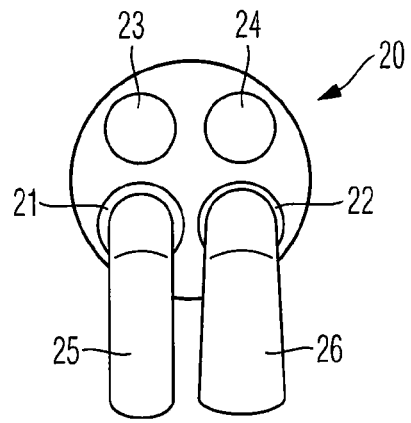
FIG. 1 shows a schematized illustration of a cylinder of an internal combustion engine according to aspects of the invention, in accordance with a first illustrative embodiment of the invention.

Each cylinder of an internal combustion engine according to aspects of the invention has a plurality of outlet valves for exhaust gas. FIG. 1 shows, in highly schematized form, a cylinder 20 of an internal combustion engine according to aspects of the invention, which has two outlet valves 21 and 22 for exhaust gas. In addition to the two outlet valves 21 and 22, the Figure also shows inlet valves 23 and 24 for charge air. Fuel is preferably introduced into the cylinder 20 by means of a separate fuel injection valve by way of direct fuel injection.

Each of the two outlet valves 21 and 22 of the cylinder 20 in FIG. 1, which serve to enable exhaust gas to flow out of the cylinder 20, is assigned an outlet duct 25 and 26 respectively. Thus, outlet duct 25 interacts with outlet valve 21, and outlet duct 26 interacts with outlet valve 22.

Figure 4:
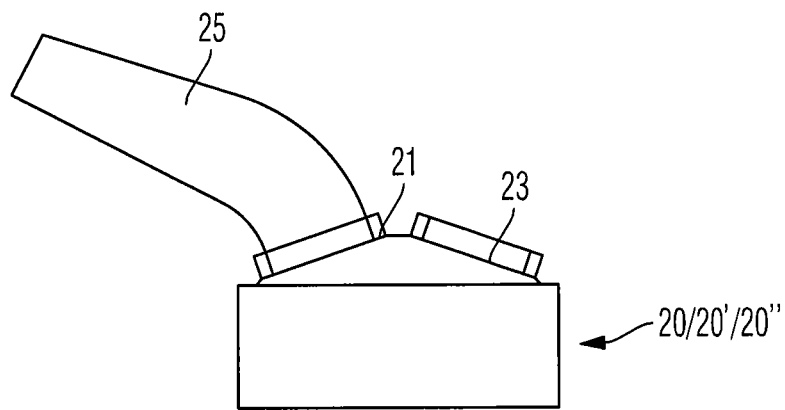
FIG. 4 shows a detail of the cylinders in FIGS. 1 to 3.
Figure 5:
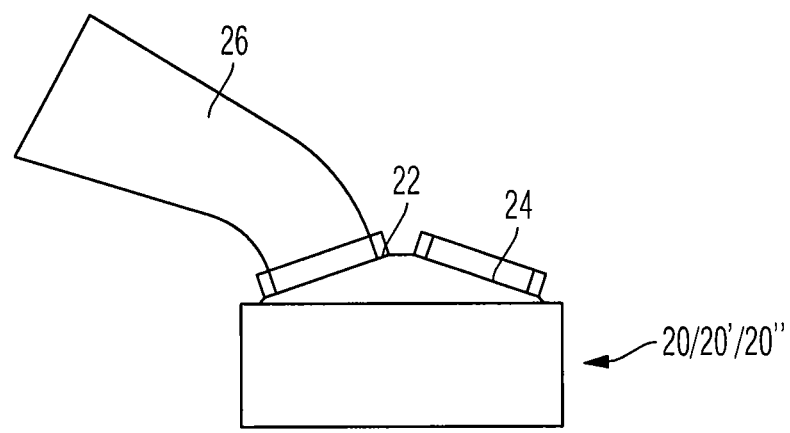
FIG. 5 shows a further detail of the cylinders in FIGS. 1 to 3.

According to aspects of the invention, a first outlet duct 25 of the cylinder 20 is contoured in the manner of a nozzle, and a second outlet duct 26 of the cylinder 20 is contoured in the manner of a diffuser. The outlet valves 21 and 22 preferably have identical flow cross sections. Starting from these identical flow cross sections of the outlet valves 21 and 22, the outlet ducts 25 and 26 are contoured in such a way that an outlet duct 25 which is contoured in the manner of a nozzle (see FIG. 4) has a narrowing flow cross section as seen in the direction of flow of the exhaust gas, whereas an outlet duct 26 which is contoured in the manner of a diffuser (see FIG. 5) has a widening flow cross section as seen in the direction of flow of the exhaust gas.

It should be pointed out that all the outlet valves 21 and 22 of a cylinder 20 should preferably have an identical flow cross section. However, it is also possible for the outlet valves 21, 22 which interact with the outlet ducts 25, 26 which have different contours to have different flow cross sections, such that, for example, an outlet valve 21 which interacts with an outlet duct 25 which is contoured in the manner of a nozzle has a larger flow cross section than an outlet valve 22 which interacts with an outlet duct 26 which is contoured in the manner of a diffuser.

It is therefore the basic idea of the invention that each cylinder 20 of an internal combustion engine should have a plurality of outlet valves 21, 22, with an outlet duct 25, 26 interacting with each outlet valve 21, 22 and at least one first outlet duct 25 of the cylinder being contoured in the manner of a nozzle and at least one second outlet duct 26 of the cylinder being contoured in the manner of a diffuser.

Figure 2:
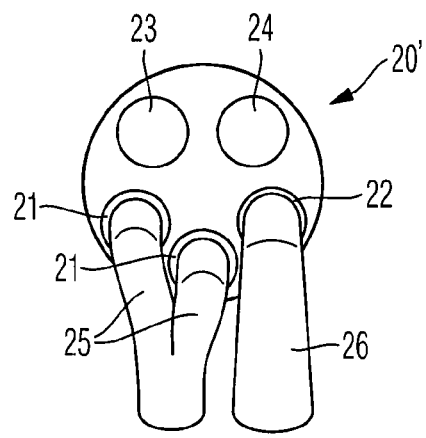
FIG. 2 shows a schematized illustration of a cylinder of an internal combustion engine according to aspects of the invention, in accordance with a second illustrative embodiment of the invention.

FIG. 2 shows an alternative cylinder 20' of an internal combustion engine according to aspects of the invention, with the cylinder 20' in FIG. 2 having three outlet valves 21 and 22 with respective outlet ducts 25 and 26, namely two first outlet valves 21, to which first outlet ducts 25, which are contoured in the manner of nozzles, are assigned, and a second outlet valve 22, to which a second outlet duct 26, which is contoured in the manner of a diffuser, is assigned.

In the illustrative embodiment of FIG. 2, the two outlet valves 21, each of which interacts with an outlet duct 25 contoured in the manner of a nozzle, are positioned immediately adjacent to one another on the cylinder 20', with the outlet ducts 25 of the two outlet valves 21 of the cylinder 20', which outlet ducts are contoured in the manner of nozzles, being combined.

Figure 3:
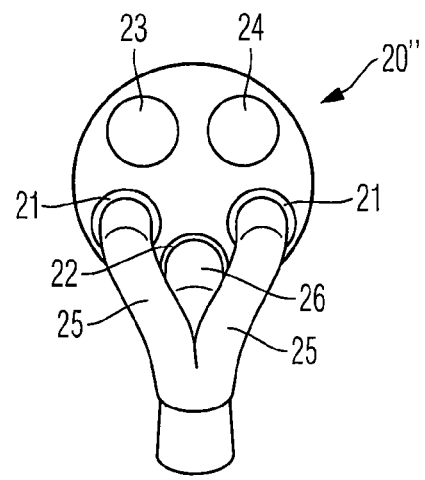
FIG. 3 shows a schematized illustration of a cylinder of an internal combustion engine according to aspects of the invention, in accordance with a third illustrative embodiment of the invention.

FIG. 3 shows another alternative of a cylinder 20" of an internal combustion engine according to aspects of the invention, which, like cylinder 20' in FIG. 2, has a total of three outlet valves 21 and 22, with two first outlet valves 21 interacting with first outlet ducts 25, which are contoured in the manner of nozzles, and a second outlet valve 22 interacting with a second outlet duct 26, which is contoured in the manner of a diffuser.

In the variant shown in FIG. 3 too, the outlet ducts 25 which are contoured in the manner of nozzles are once again combined but, in the case of the cylinder 20" in FIG. 3, in contrast to the cylinder 20' in FIG. 2, the outlet valves 21 which interact with the outlet ducts 25 which are contoured in the manner of nozzles are not positioned immediately adjacent to one another on the cylinder 20″; instead, in FIG. 3 the second outlet valve 22, which interacts with the outlet duct 26 which is contoured in the manner of a diffuser, is positioned between the two first outlet valves 21, which interact with outlet ducts 25 which are each contoured in the manner of a nozzle.

With the variant in FIG. 3, it is possible to ensure a more uniform incident flow of exhaust gas to the outlet valves 21 which interact with the outlet valves 25 which are contoured in the manner of nozzles.

Figure 6:
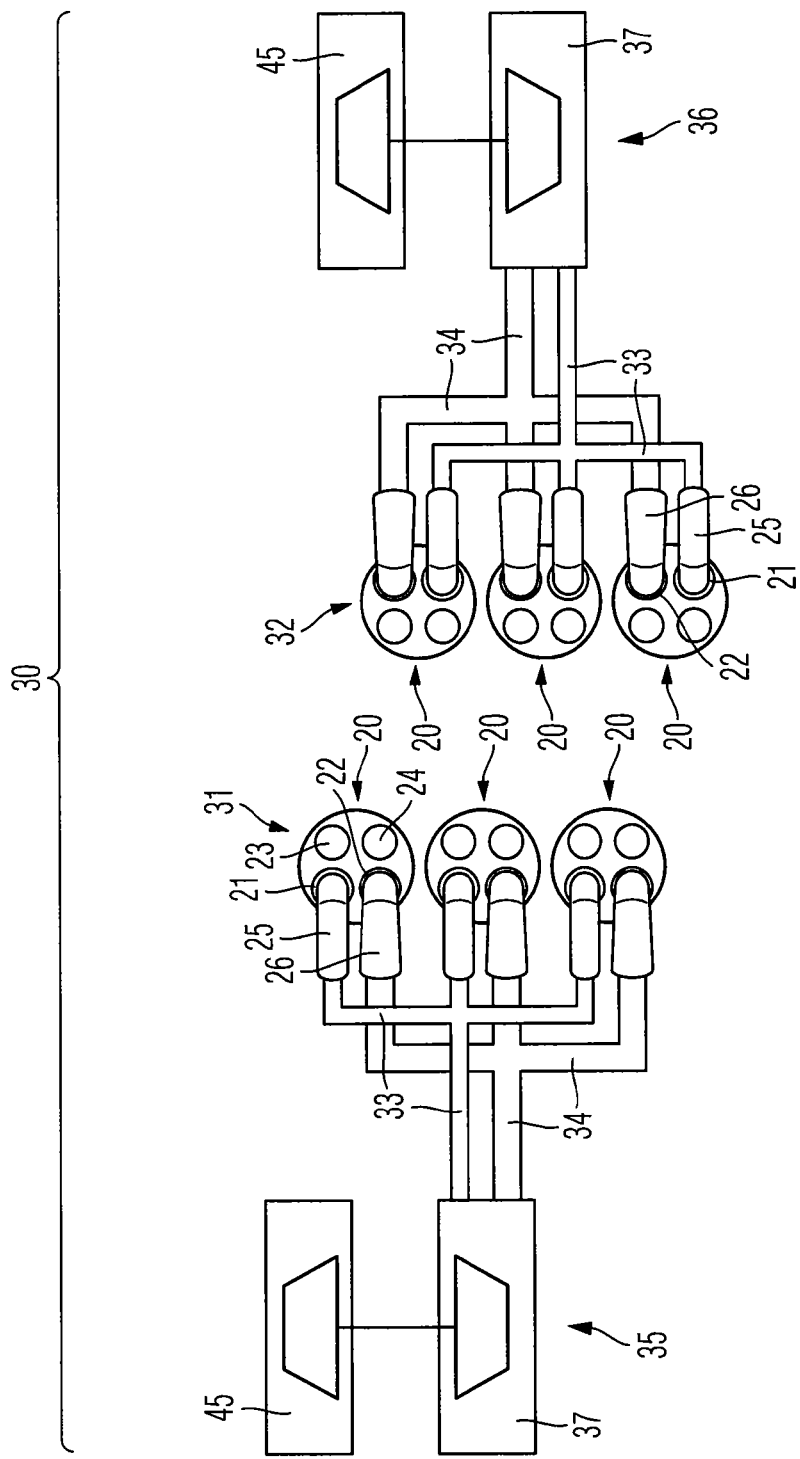
FIG. 6 shows a schematized illustration of an internal combustion engine according to aspects of the invention with cylinders as per FIG. 1.

FIG. 6 shows a schematized illustration of an internal combustion engine 30 according to aspects of the invention with two cylinder groups 31 and 32, each comprising three cylinders, with the cylinders 20 from FIG. 1 being employed in FIG. 6. The internal combustion engine in FIG. 6 can be a horizontally opposed or V-type 6-cylinder internal combustion engine.

According to FIG. 6, each cylinder 20 of the two cylinder groups 31 and 32 comprises a first outlet valve 21, which interacts with a first outlet duct 25, which is contoured in the manner of a nozzle, and a second outlet valve 22, which interacts with a second outlet duct 26, which is contoured in the manner of a diffuser.

In the region of each cylinder group 31, 32, the outlet ducts 25 of the cylinders 20 of the respective cylinder group 31, 32, which outlet ducts are contoured in the manner of nozzles, each open into a common first exhaust manifold 33, whereas the outlet ducts 26 of the cylinders 20 of the two cylinder groups 31 and 32, which outlet ducts are contoured in the manner of diffusers, each open into a common second exhaust manifold 34.

In the illustrative embodiment in FIG. 6, each cylinder group 31 and 32 is assigned a separate exhaust turbocharger 35 and 36 respectively, with both exhaust manifolds 33 and 34 of cylinder groups 31 and 32 leading to the turbine 37 of the respective separate exhaust turbocharger 35 or 36 in order to expand the exhaust gas from the respective cylinder group 31 or 32 in the respective exhaust turbocharger 35 or 36 of the respective cylinder group 31 or 32.

The first exhaust manifolds 33, into which the outlet ducts 25 which are contoured in the manner of nozzles open, have a relatively small flow cross section for the exhaust gas, whereas the second exhaust manifolds 34, into which the outlet ducts 26 which are contoured in the manner of diffusers open, have a relatively large flow cross section.

As already explained, both exhaust manifolds 33 and 34 of the respective cylinder group 31 or 32 in the illustrative embodiment in FIG. 6 carry the exhaust gas from the respective cylinder group 31 or 32 to the separate or dedicated exhaust turbocharger 35 or 36 assigned to the respective cylinder group 31 or 32.

The flow or routing of the exhaust gas from the cylinders 20 of cylinder groups 31 and 32 of the internal combustion engine 30 shown in FIG. 6 to the respective exhaust turbochargers 35 and 36 of cylinder groups 31 and 32 via exhaust manifolds 33 and 34 respectively takes place in accordance with the operating state of the internal combustion engine. Depending on the operating state of the internal combustion engine 30, either the second outlet valves 22 of the cylinders 20, which valves interact with the second outlet ducts 26, which are contoured in the manner of diffusers, or the second outlet ducts 26, which are contoured in the manner of diffusers, or the respective second exhaust manifolds 34, into which the second outlet ducts 26, which are contoured in the manner of diffusers, open, are activated or deactivated.

This activation or deactivation of outlet valves of the cylinders 20 of the internal combustion engine 30 in accordance with the operating state of the internal combustion engine or the activation or deactivation of the outlet ducts which interact with the outlet valves affects only the second outlet ducts 26, which are contoured in the manner of diffusers, or the second outlet valves 22, which interact with the latter, but does not affect the first outlet ducts 25, which are contoured in the manner of nozzles, or the first outlet valves 21, which interact with the latter. The outlet ducts 25 which are contoured in the manner of nozzles or the outlet valves 21 which interact with the latter are activated in all operating states of the internal combustion engine.

In part-load operation of the internal combustion engine 30 or in unsteady-state operation of the internal combustion engine 30 or in full-load operation of the internal combustion engine 30 in a lower engine speed range of the latter, exhaust gas from the cylinders 20 of cylinder groups 31 and 32 flows to the exhaust turbochargers 35 and 36 exclusively via the first exhaust manifolds 33. In these operating states, the second outlet ducts 26, which are contoured in the manner of diffusers, and the second outlet valves 22, interacting with the latter, of the cylinders 20 of cylinder groups 31 and 32 are thus deactivated, whereas only the first outlet ducts 25, which are contoured in the manner of nozzles, or the first outlet valves 21, which interact with the latter, are activated.

Whenever the internal combustion engine 30 is operated in full-load mode at medium speeds or high speeds of the internal combustion engine 30, exhaust gas can flow to the respective exhaust turbochargers 35 and 36 via both exhaust manifolds 33 and 34 of the respective cylinder groups 31 and 32, in which case the second outlet ducts 26 of the cylinders 20, which outlet ducts are contoured in the manner of diffusers, or the second outlet valves 22 of the cylinders 20, which outlet valves interact with said ducts, are then activated.

The activation and deactivation, in accordance with the operating state of the internal combustion engine 30, of the outlet ducts 26 which are contoured in the manner of diffusers or of the outlet valves 22 which interact with the latter is preferably not performed abruptly across all the cylinders 20 but is applied selectively to the cylinders in accordance with the ignition sequence of the cylinders 20. This can take place alternately between cylinder groups 31 and 32 in accordance with the ignition sequence of the cylinders 20 of cylinder groups 31 and 32.

Figure 7:
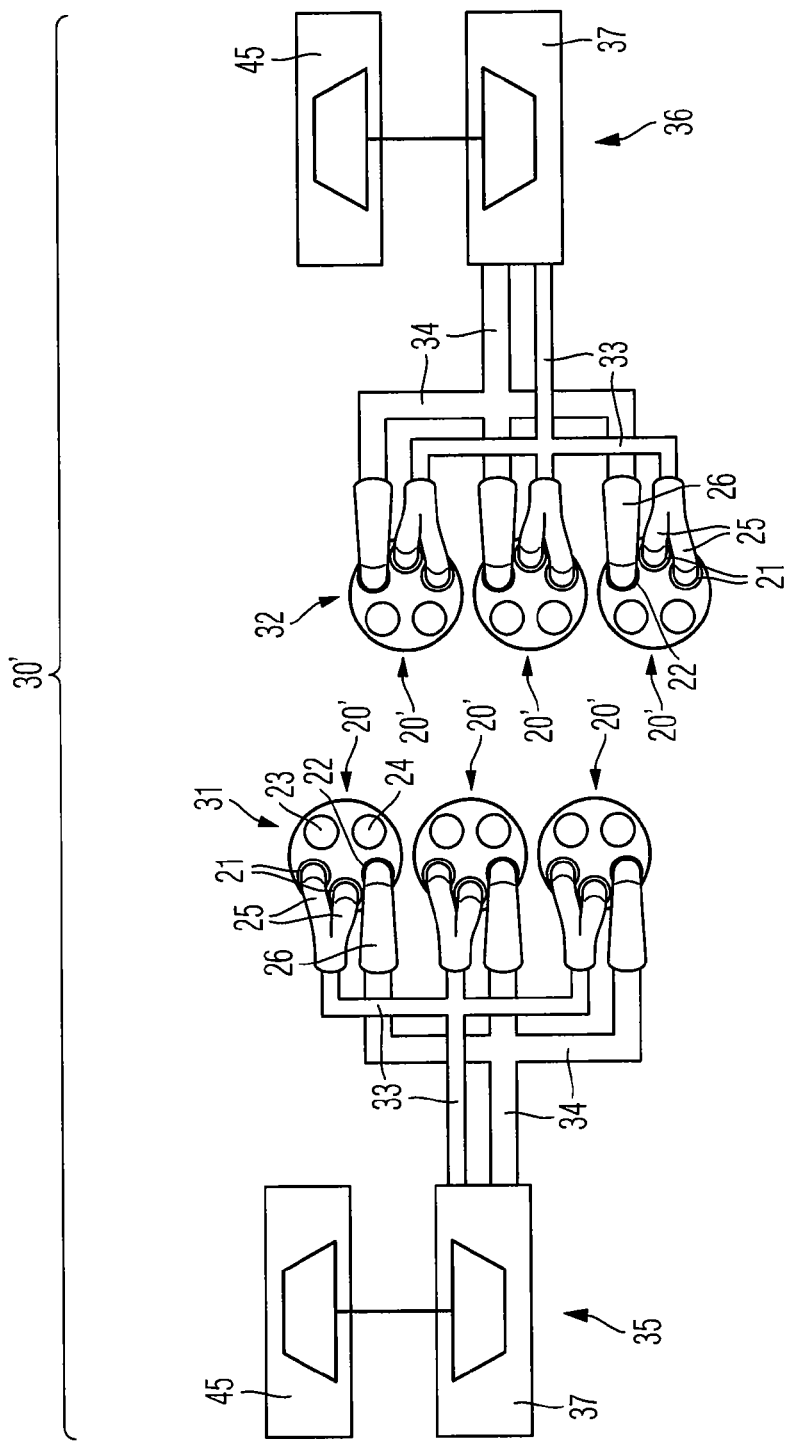
FIG. 7 shows a schematized illustration of another internal combustion engine according to aspects of the invention with cylinders as per FIG. 2.

FIG. 7 shows an illustrative embodiment of an internal combustion engine 30′ which corresponds in terms of its basic construction and operation to the internal combustion engine 30 in FIG. 6, the only difference between the internal combustion engine 30′ in FIG. 7 and the internal combustion engine 30 in FIG. 6 being that the cylinders 20′ shown in FIG. 2 rather than the cylinders 20 shown in FIG. 1 are employed in the internal combustion engine 30′ in FIG. 7. As an alternative, it is also possible to employ the cylinders 20″ from FIG. 3 in the internal combustion engines in FIGS. 6 and 7.

Figure 8:
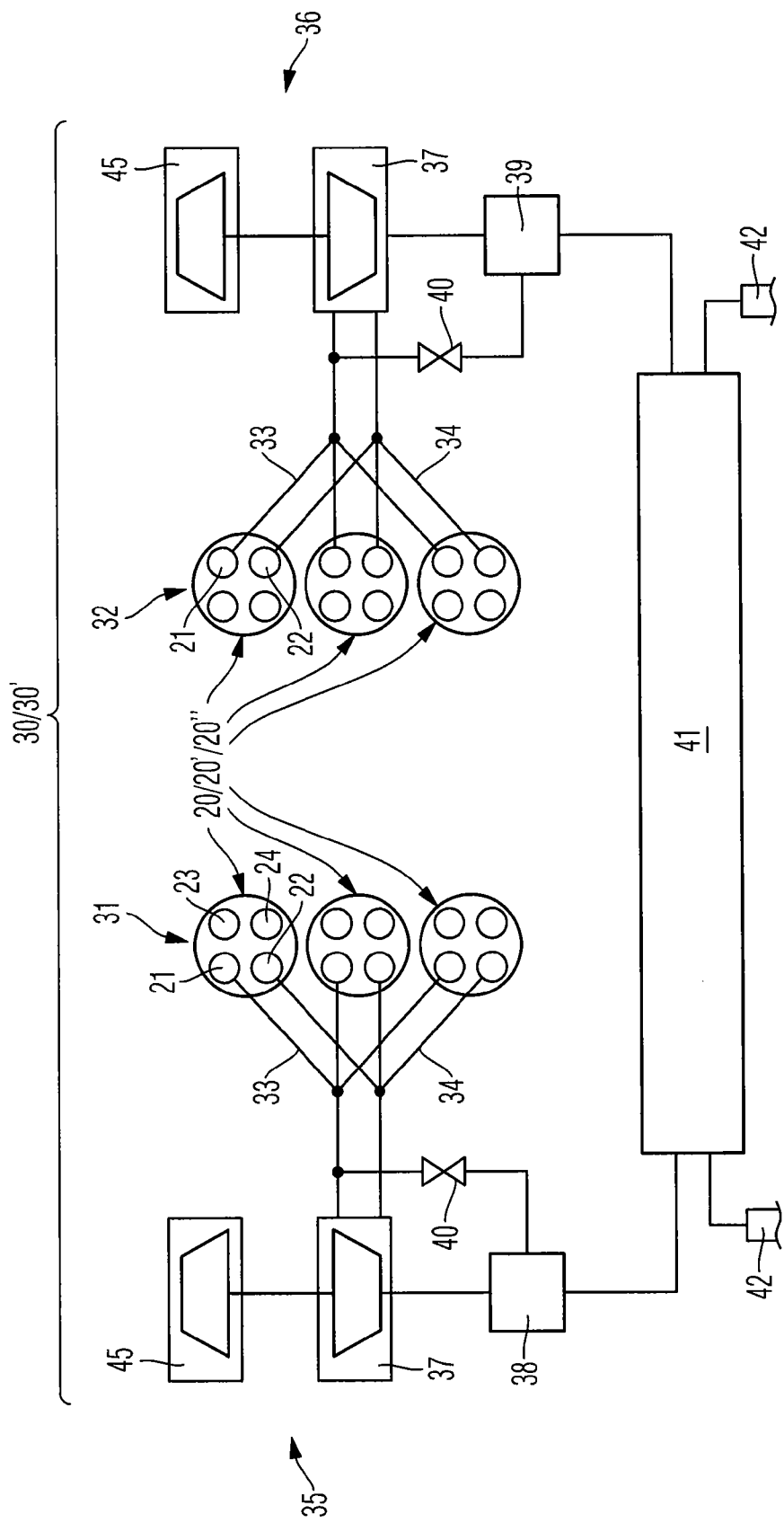
FIG. 8 shows a schematized illustration of the internal combustion engine as per FIG. 6 or 7 together with details of an exhaust gas aftertreatment system arranged downstream of the exhaust turbochargers.

FIG. 8 shows further details relating to the internal combustion engines in FIGS. 6 and 7, namely details of an exhaust gas aftertreatment system arranged downstream of the exhaust turbochargers 35 and 36 of cylinder groups 31 and 32. Thus, it is possible to see from FIG. 8 that each cylinder group 31, 32 is assigned a dedicated or separate catalytic converter 38, 39, specifically in such a way that exhaust gas which leaves the turbine 37 of the respective exhaust turbocharger 35, 36 flows into a catalytic converter 38, 39 assigned to the respective cylinder group 31, 32.

By means of a bypass valve 40, it is possible, in the region of each cylinder group 31, 32, to divert exhaust gas that is being carried via the first exhaust manifolds 33 past the turbine 37 of the respective exhaust turbocharger 35, 36 and directly into the respective catalytic converter 38, 39.

The cylinder-group-specific catalytic converters 38 and 39 are assigned a common tail muffler 41, after flowing through which the exhaust gas is discharged into the environment of the motor vehicle via exhaust tailpipes 42.

Figure 9:
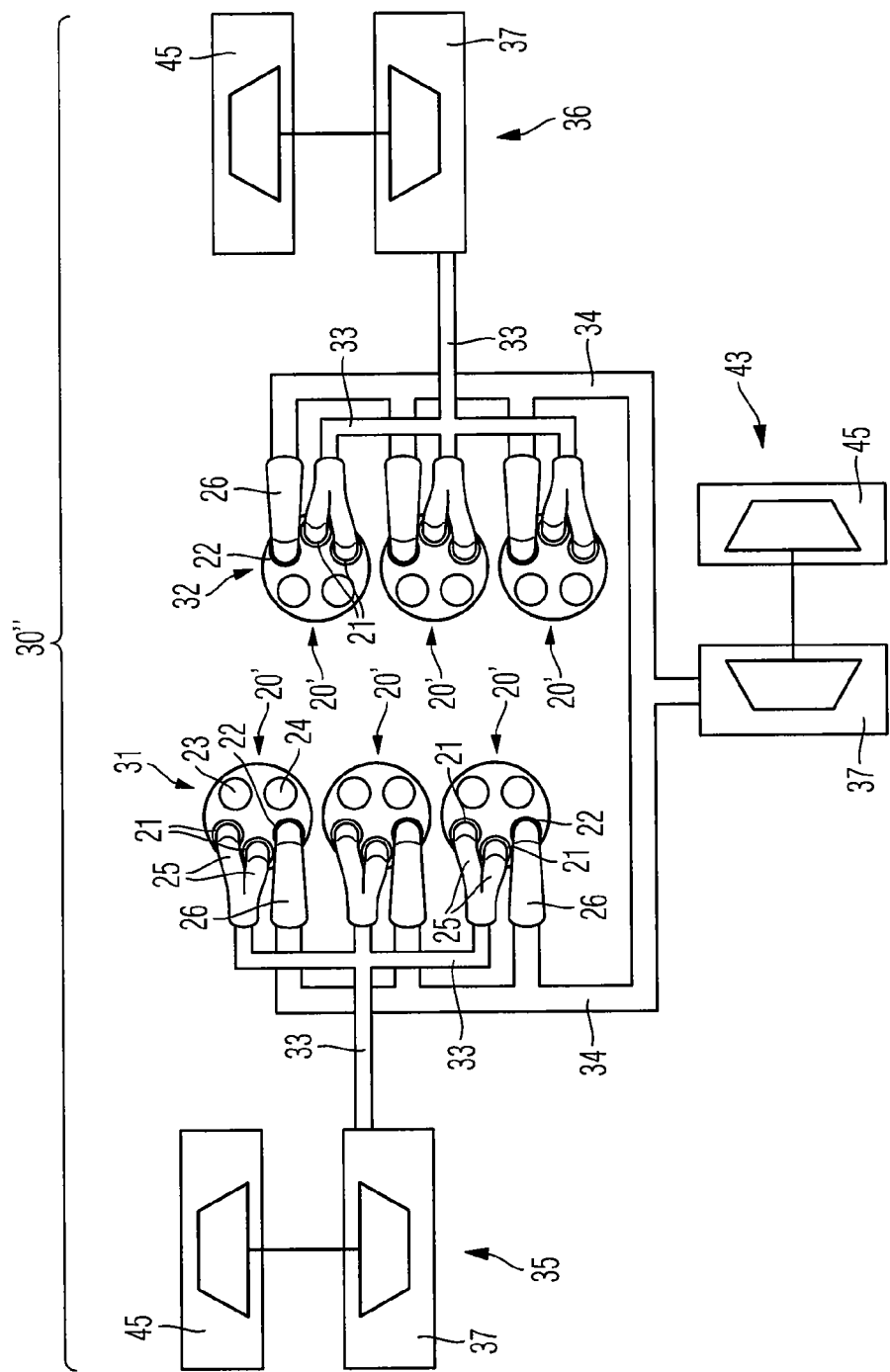
FIG. 9 shows a schematized illustration of another internal combustion engine according to aspects of the invention with cylinders as per FIG. 2.

FIG. 9 shows another illustrative embodiment of an internal combustion engine 30" according to aspects of the invention, which has two cylinder groups 31 and 32, each comprising three cylinders, with the cylinders 20' shown in FIG. 2 being employed in FIG. 9. It should be pointed out that it is also possible to use the cylinders 20 or 20" from FIGS. 2 and 3 in FIG. 9.

In the illustrative embodiment in FIG. 3, each cylinder 20' has two first outlet valves 21 with first outlet ducts 25, which are contoured in the manner of nozzles, and a second outlet valve 22 with a second outlet duct 26, which is contoured in the manner of a diffuser.

In the region of each cylinder group 31, 32, the outlet ducts 25 of the cylinders 20', which outlet ducts are contoured in the manner of nozzles, each open into a common first exhaust manifold 33, via which the exhaust gas leaving the cylinders 20' of cylinder groups 31, 32 via the outlet valves 21 which interact with the nozzle-type outlet ducts can be fed to a turbine 37 of the respective cylinder-group-specific exhaust turbocharger 35, 36.

It can furthermore be seen from FIG. 9 that the second outlet ducts 26, which are contoured in the manner of diffusers, each open in the region of each cylinder group 31, 32 into a common second exhaust manifold 34, although, in FIG. 9, the second exhaust manifolds 34 of cylinder groups 31 and 32, into which the respective second outlet ducts 26 of the cylinders 20 open, which outlet ducts are contoured in the manner of diffusers, are combined, and the exhaust gas leaving the cylinders 20' of the internal combustion engine 30" via the outlet valves 22 which interact with the second outlet ducts 26, which are contoured in the manner of diffusers, is carried via the combined second exhaust manifolds 34 to a third exhaust turbocharger 43, namely a turbine 37 thereof, and hence the third exhaust turbocharger 43 is an exhaust turbocharger 43 common to both cylinder groups 31, 32.

As already described in connection with FIGS. 6 and 7 in relation to internal combustion engines 30 and 30', the activation and deactivation of the outlet ducts 26 which are contoured in the manner of diffusers or of the outlet valves 22, interacting with the latter, of the cylinders 20' of the internal combustion engine 30" in FIG. 9, is thus performed in such a way that, in part-load operation of the internal combustion engine or in unsteady-state operation of the internal combustion engine or in full-load operation of the internal combustion engine in a lower engine speed range of the latter, exhaust gas is fed to the cylinder-group-specific exhaust turbochargers 35, 36 exclusively via the first exhaust manifolds 33 and hence via the outlet ducts 25 which are contoured in the manner of nozzles and hence via the first outlet valves 21, which interact with the latter. In full-load operation of the internal combustion engine 30" in FIG. 9 at medium speeds or high speeds of the latter, the outlet ducts 26 which are contoured in the manner of diffusers or the second outlet valves 22, which interact with the latter, are activated, with the result that, in full-load operation at medium and high speeds of the internal combustion engine 30" in FIG. 9, exhaust gas can then be fed to the turbine 37 of the common exhaust turbocharger 43 via the second exhaust manifolds 34.

Figure 10:
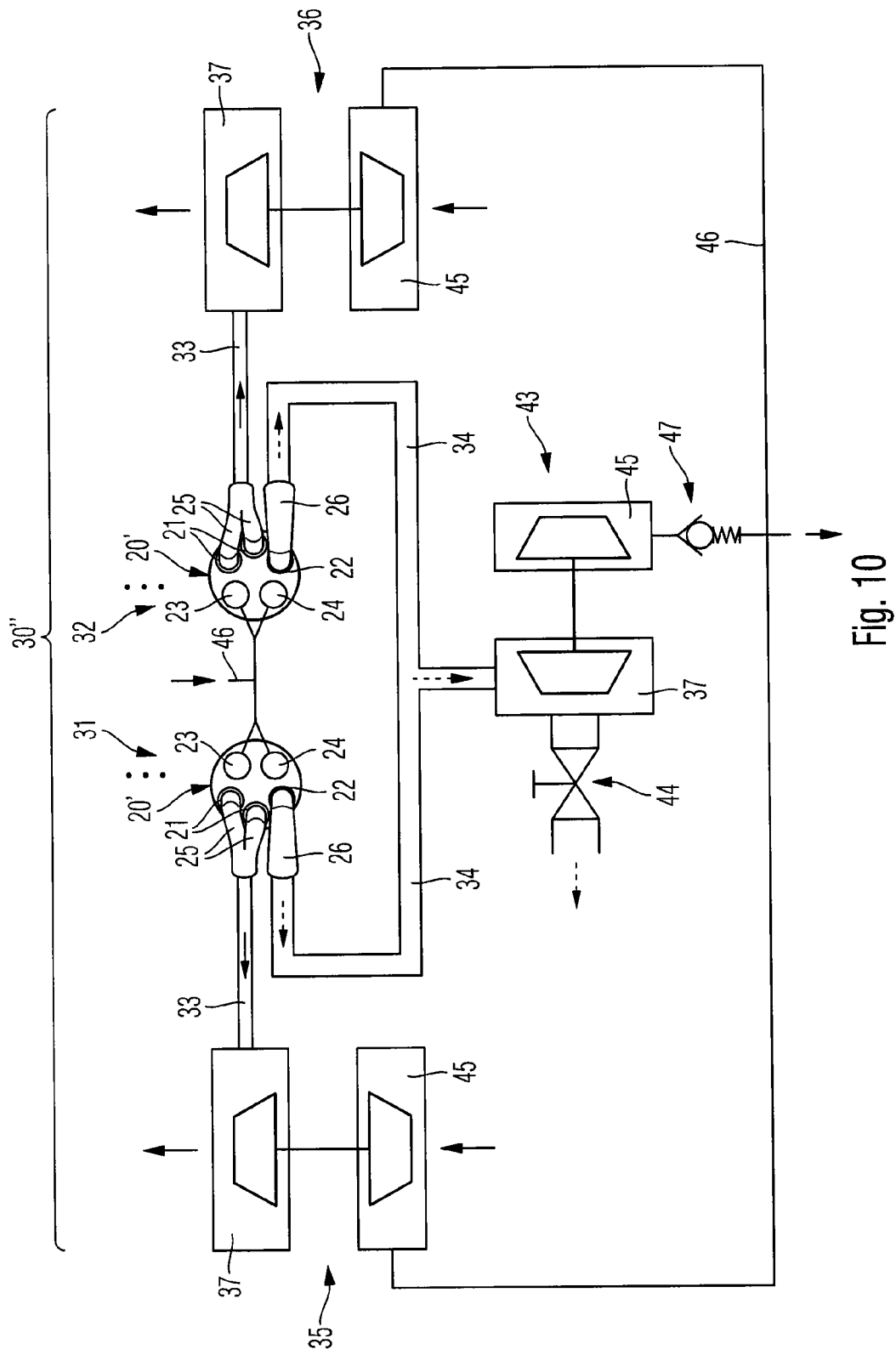
FIG. 10 shows further details of the internal combustion engine in FIG. 10.

Further details of the internal combustion engine 30" in FIG. 9 are shown in FIG. 10, although only one cylinder of each cylinder group 31, 32 is shown in FIG. 10 for the sake of clarity. Thus, FIG. 10 shows, in particular, that the common exhaust turbocharger 43, namely the turbine 37 thereof, is assigned a turbine activation valve 44, via which the exhaust turbocharger 43 can be selectively activated or deactivated in accordance with the operating state of the internal combustion engine 30". Whenever the turbine activation valve 44 is closed, no exhaust gas can flow through the turbine 37 of exhaust turbocharger 43, with the result that exhaust gas can then be directed only via the cylinder-group-specific exhaust turbochargers 35 and 36. To activate the common exhaust turbocharger 43, the turbine activation valve 44 must be opened.

FIG. 10 furthermore shows details of a charge air flow, and it can be seen from FIG. 10 that charge air can be compressed in the region of each compressor 45 and fed to the inlet valves 23 and 24 of the cylinders 20' via charge air lines 46. In order to avoid compressed charge air from flowing across into the third turbocharger 43 when the latter is deactivated, the compressor 45 of the third turbocharger 43 is assigned a check valve 47 on the outlet side, said valve preventing charge air compressed by the compressors 45 of the cylinder-group-specific exhaust turbochargers 35 and 36 from flowing across in the region of the compressor 45 of the common exhaust turbocharger 43.

Figure 11:
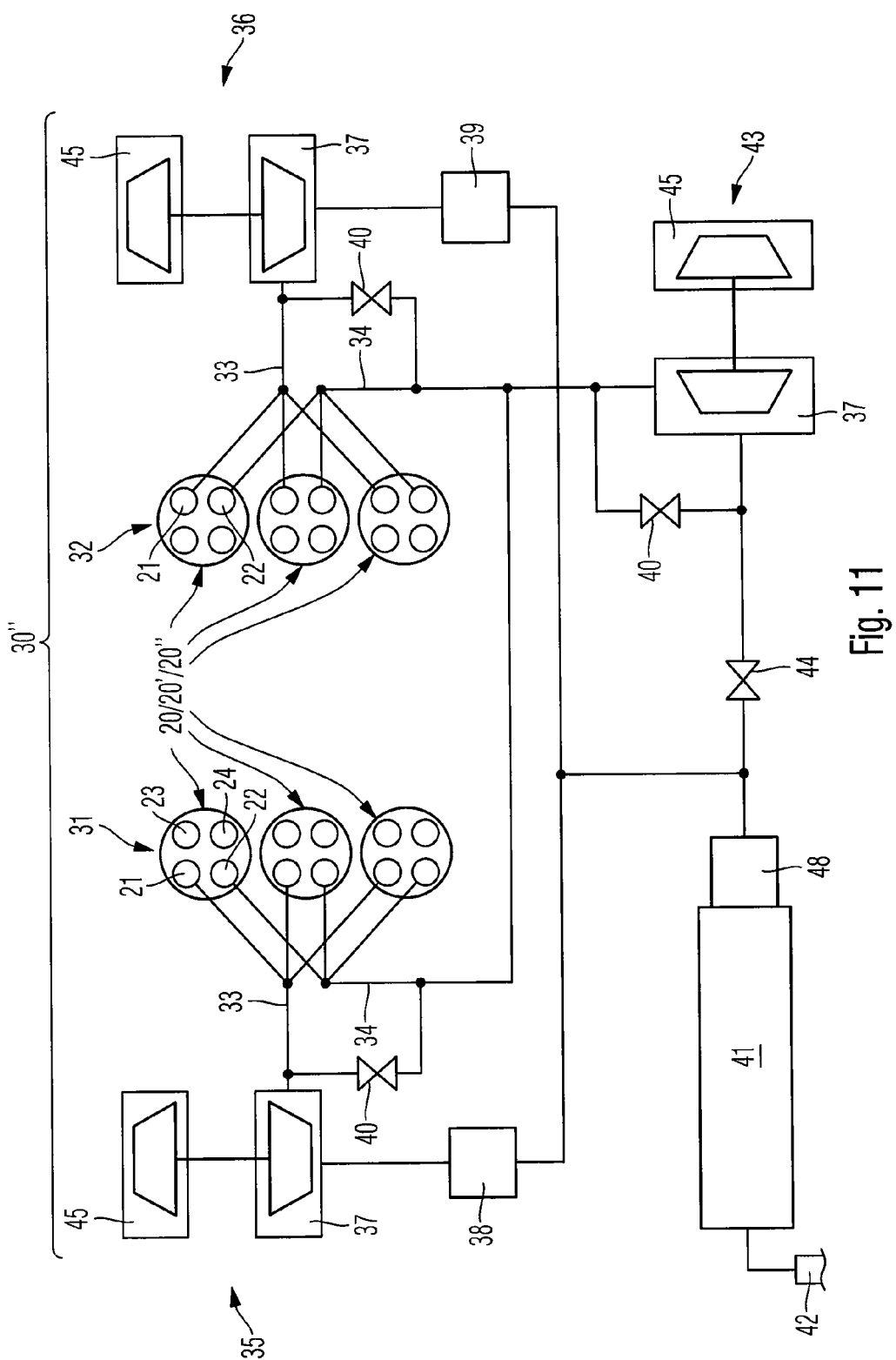
FIG. 11 shows a schematized illustration of the internal combustion engine as per FIGS. 9 and 10 together with details of an exhaust gas aftertreatment system arranged downstream of the exhaust turbochargers.

FIG. 11 shows further details of the internal combustion engine 30" in FIGS. 9 and 10, specifically details of an exhaust gas aftertreatment device arranged downstream of the exhaust turbochargers 35, 36 and 43, and, in FIG. 11, the exhaust gas which is passed via the cylinder-group-specific exhaust turbochargers 35 and 36, namely the turbines 37 thereof, is directed to cylinder-group-specific catalytic converters 38 and 39.

Each cylinder-group-specific exhaust turbocharger 35, 36 is once again assigned a bypass valve 40, via which the exhaust gas flowing via the first exhaust manifolds 33 can be diverted past the turbine 37 of the respective cylinder-group-specific exhaust turbocharger 35, 36 and routed via the second exhaust manifolds in the direction of the common exhaust turbocharger 43 of cylinder groups 31 and 32.

According to FIG. 11, the exhaust turbocharger 43 common to both cylinder groups 31 and 32 is also assigned a bypass valve 40, via which the exhaust gas can be diverted past the turbine 37 thereof.

Exhaust gas which is passed via the cylinder-group-specific exhaust turbochargers 35 and 36 and then via the cylinder-group-specific catalytic converters 38 and 39, can then be directed via a common catalytic converter 48, with the exhaust gas which is diverted past the exhaust turbochargers 35, 36 and 43 via the bypass valves 40 or is directed via the common exhaust turbocharger 43 also being passed via this common catalytic converter 48. A common tail muffler 45 is once again present for both cylinder groups 31 and 32.

Figure 12:
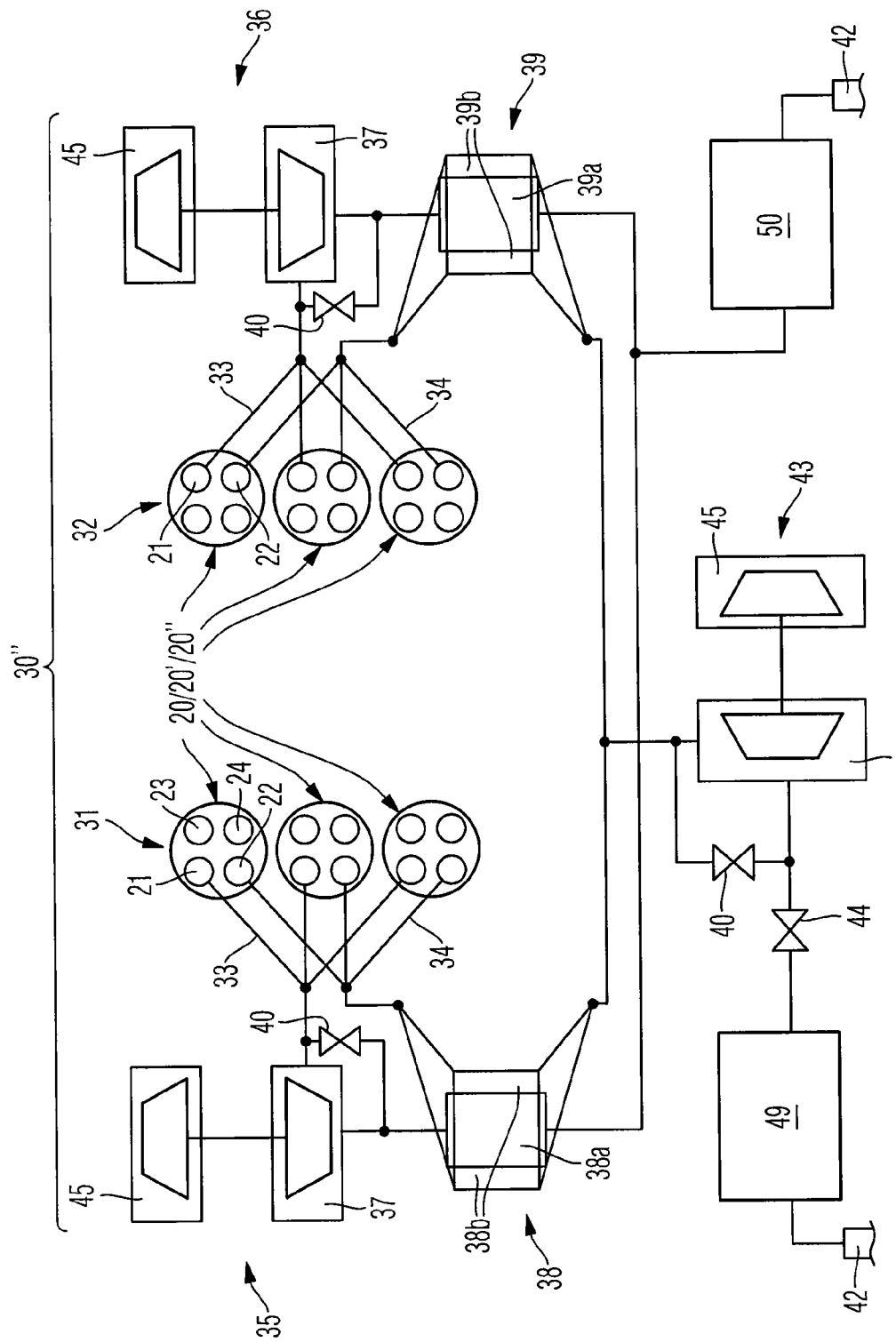
FIG. 12 shows a schematized illustration of the internal combustion engine as per FIGS. 9 and 10 together with details of an alternative exhaust gas aftertreatment system arranged downstream of the exhaust turbochargers.

FIG. 12 shows alternative details to those in FIG. 11 of an exhaust gas aftertreatment device arranged downstream of the exhaust turbochargers 35, 36 and 43. Thus, in FIG. 12 each cylinder group 21, 32 is once again assigned dedicated catalytic converters 38 and 39 although, in contrast to FIG. 11, these are embodied as "ring-type catalytic converters", with exhaust gas which is directed via the first exhaust manifolds 33 being directed via an inner catalytic converter section 38a, 39a of the ring-type catalytic converters 38 and 39, whereas exhaust gas which is passed via the second exhaust manifolds 34 is passed via an outer catalytic converter section 38b, 39b of the ring-type catalytic converters 38 and 39. Exhaust gas which is passed via the first exhaust manifolds 33, i.e. leaves the cylinders 20, 20' and 20" via those outlet valves 21 which interact with the outlet ducts 25 which are contoured in the manner of nozzles, is either passed via the cylinder-group-specific exhaust turbochargers 35 and 36 or diverted past them via bypass valves 40 but is in either case directed via the inner catalytic converter section 38a, 39a of the respective ring-type catalytic converter 38, 39. By contrast, exhaust gas leaving cylinder groups 31 and 32 via the second exhaust manifolds 34, i.e. flowing out via those outlet valves 22 of the cylinders 20, 20' and 20" which interact with the ducts 26 which are contoured in the manner of diffusers is in each case diverted past the cylinder-group-specific exhaust turbochargers 35 and 36 and, after passing through the outer catalytic converter sections 38b, 39b of the respective ring-type catalytic converter 38, 39 is guided in the direction of the common exhaust turbocharger 43. Depending on the position of the bypass valve 40 assigned thereto, said exhaust gas is either passed via the turbine 37 of the common exhaust turbocharger 43 or diverted past the latter.

In the variant of the internal combustion engine 30" in FIG. 12, there are two tail mufflers 49 and 50, with tail muffler 49 being arranged downstream of the common exhaust turbocharger 43, and with tail muffler 50 being arranged downstream of the cylinder-group-specific exhaust turbochargers 35 and 36. Exhaust gas which is discharged from the cylinders 20, 20' and 20" via the outlet ducts 25 which are contoured in the manner of nozzles and hence via the first exhaust manifolds 33 passes into the environment exclusively via tail muffler 50. In contrast, the exhaust gas which is discharged from the cylinders 20, 20' and 20" of cylinder groups 21 and 32 via the outlet ducts 26 which are contoured in the manner of diffusers and hence via the second exhaust manifolds 34 passes into the environment exclusively via tail muffler 49.

Figure 13:
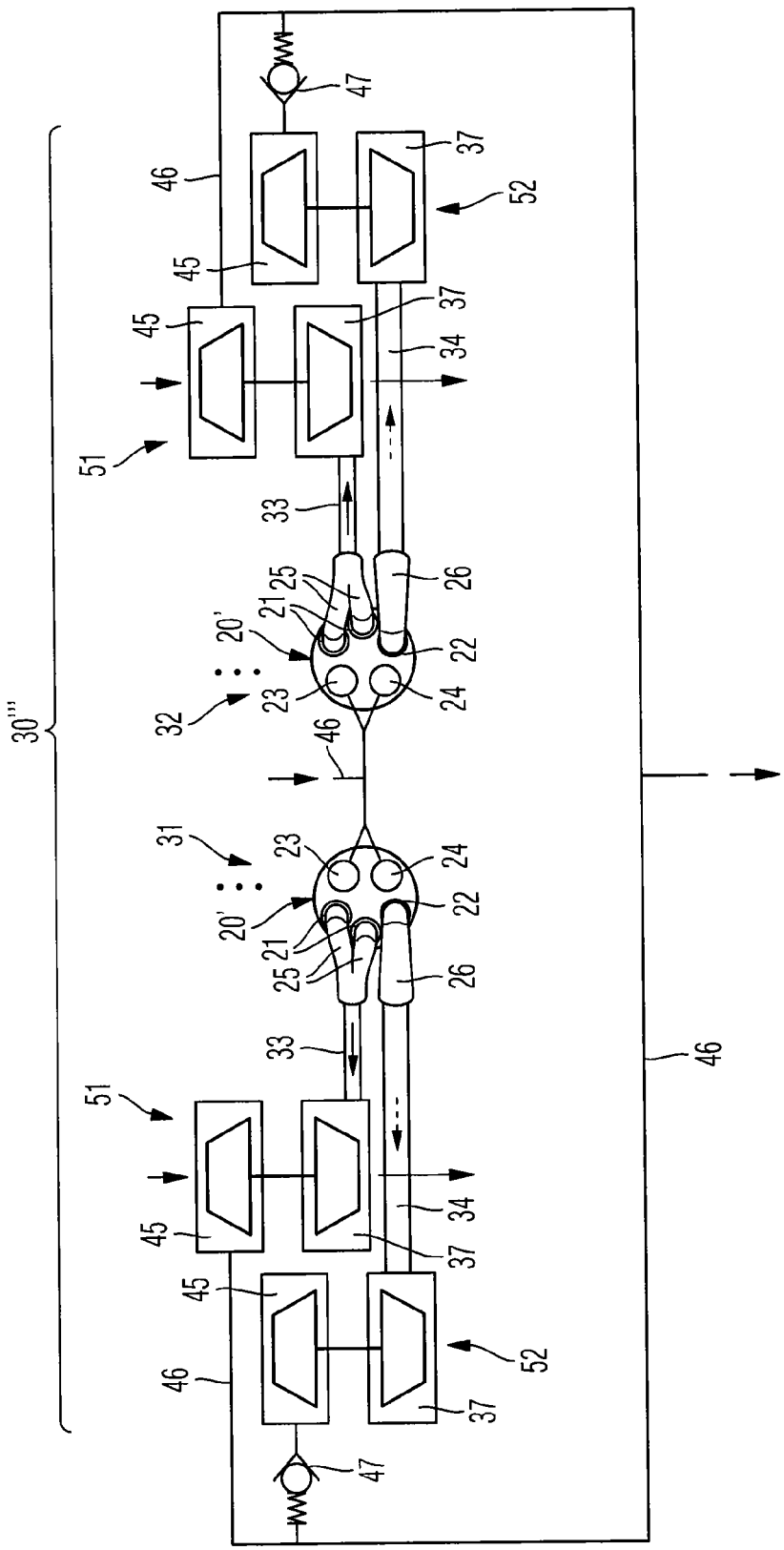
FIG. 13 shows a schematized illustration of another internal combustion engine according to aspects of the invention.

Another illustrative embodiment of an internal combustion engine 30'" according to aspects of the invention is shown in FIG. 13. The internal combustion engine 30'" in FIG. 13 once again has two cylinder groups 31 and 32, each comprising a plurality of cylinders, with the cylinders 20' from FIG. 2 once again being employed, by way of example, in FIG. 13 and only one cylinder being shown per cylinder group. It should be noted that the cylinders 20 or 20" from FIGS. 1 and 2 can also be employed for the internal combustion engine 30'" in FIG. 13.

In the illustrative embodiment in FIG. 13, each cylinder group 31, 32 is assigned two cylinder-group-specific exhaust turbochargers 51, 52. Here, each cylinder group has exhaust turbocharger 51 for exhaust gas flowing via the first exhaust manifolds 33, i.e. for exhaust gas which is discharged from the cylinders 20' of cylinder groups 31 and 32 via outlet ducts 25 which are contoured in the manner of nozzles, whereas each cylinder group has exhaust turbocharger 52 for exhaust gas flowing via the second exhaust manifolds 34, i.e. for exhaust gas which is directed out of the cylinders 20' of cylinder groups 31 and 32 via the outlet ducts 26 which are contoured in the manner of diffusers.

Whenever the outflow ducts 26 which are contoured in the manner of diffusers and the outlet valves 22 which interact with the latter are deactivated in accordance with the operating state of the internal combustion engine 30'", the exhaust turbochargers 52 are also deactivated and, as a result, exhaust gas is then passed exclusively via the exhaust turbochargers 51 in these operating states of the internal combustion engine.

Only when the outlet ducts 26 which are contoured in the manner of diffusers or the outlet valves 22 which interact with the latter are activated in full-load operation of the internal combustion engine 30'" in a medium engine speed range and in a high engine speed range of the latter does exhaust gas also flow via the exhaust turbochargers 52.

According to FIG. 13, the compressors 45 of the exhaust turbochargers 52, to the turbines 37 of which exhaust gas can be directed via the second exhaust manifolds 34, are assigned check valves 47, to prevent charge air that has been compressed in the compressors 45 of the exhaust turbochargers 51 from flowing across into the compressors 45 of the exhaust turbochargers 52.

Figure 14:
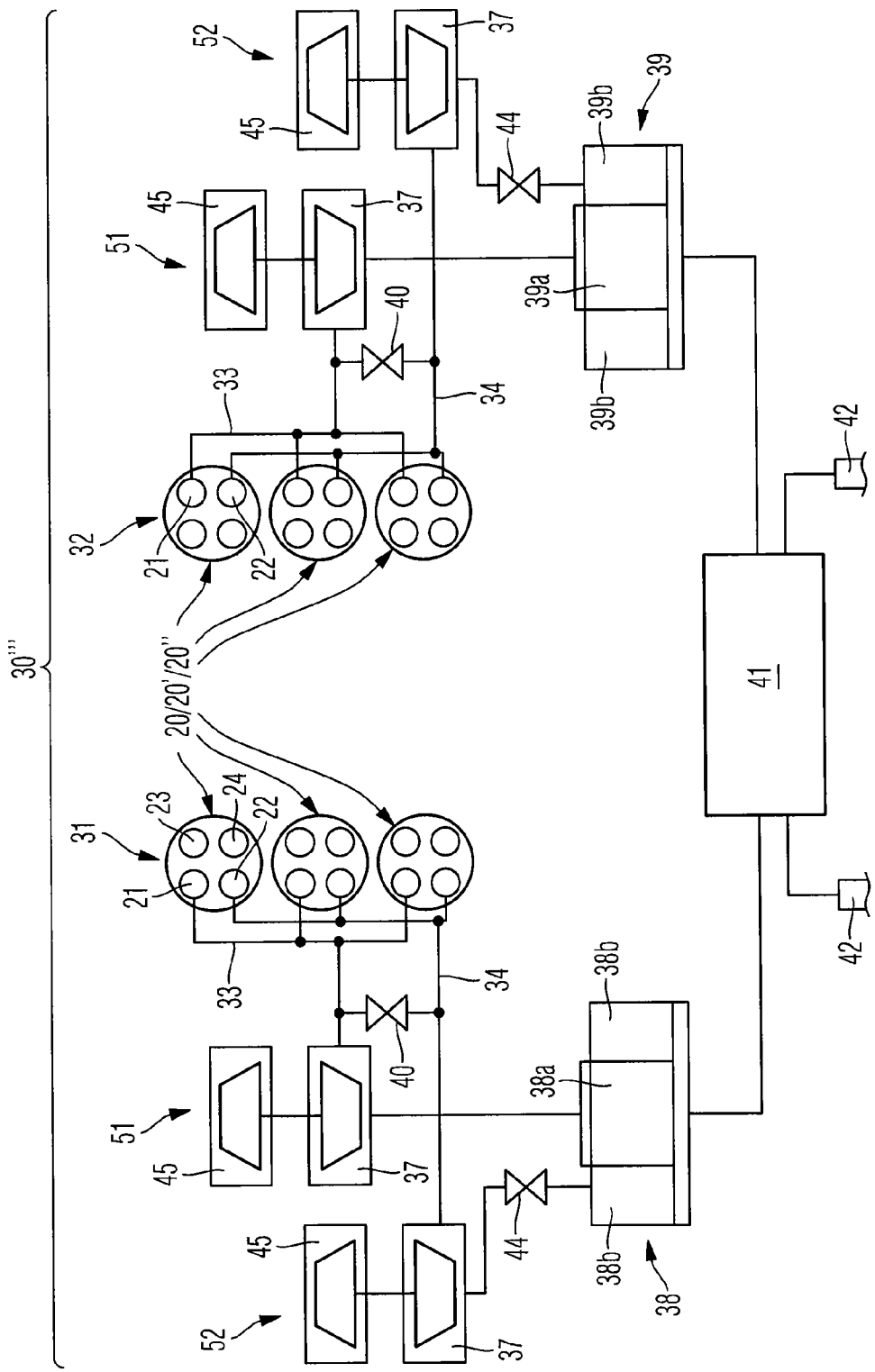
FIG. 14 shows a schematized illustration of the internal combustion engine as per FIG. 13 together with details of an exhaust gas aftertreatment system arranged downstream of the exhaust turbochargers.
Figure 15:
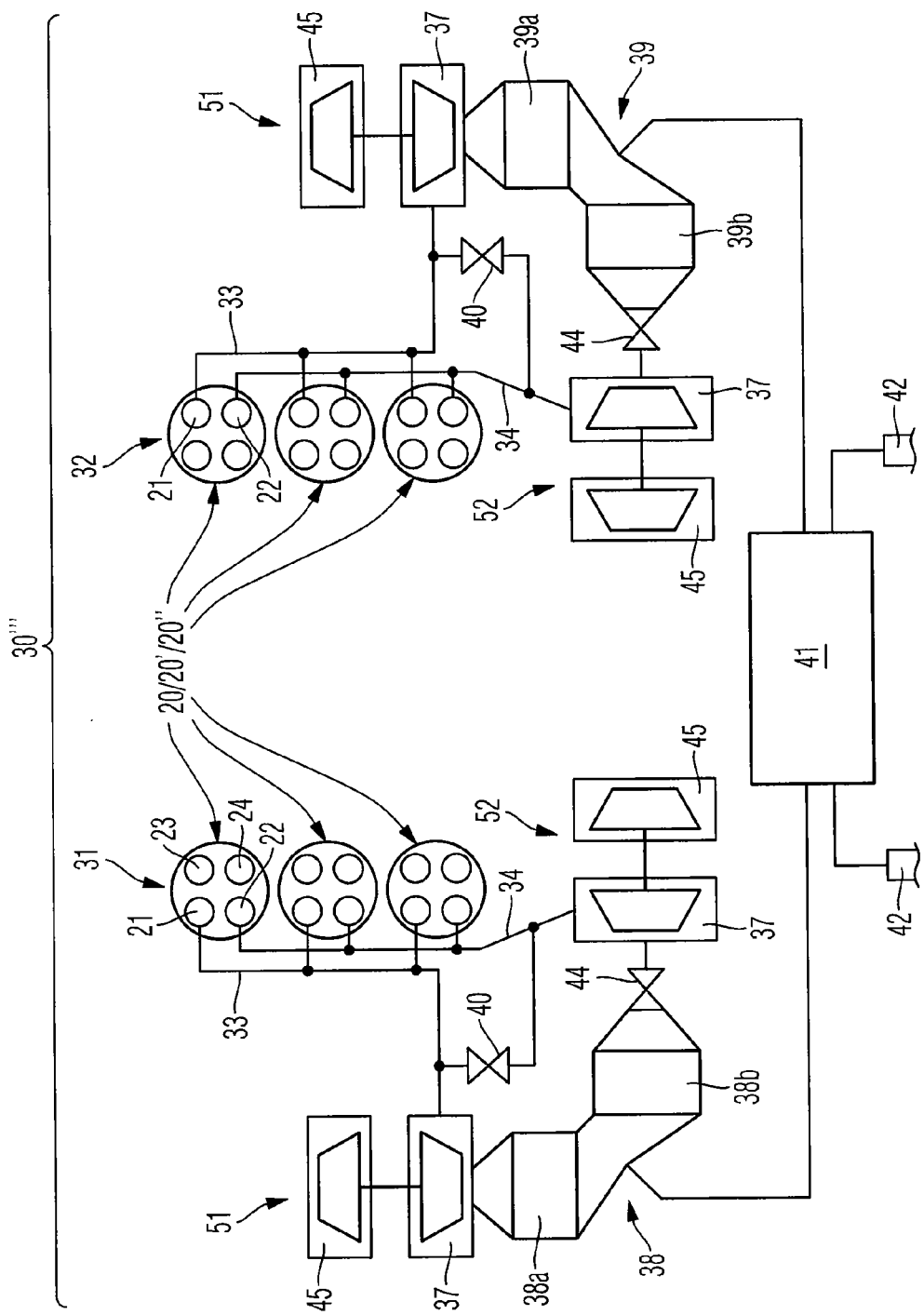
FIG. 15 shows a schematized illustration of the internal combustion engine as per FIG. 13 together with details of an alternative exhaust gas aftertreatment system arranged downstream of the exhaust turbochargers.

FIGS. 14 and 15 show possible details of the internal combustion engine 30'" in FIG. 13, said details relating to exhaust gas aftertreatment downstream of the exhaust turbochargers 51 and 52. Thus, in FIG. 13 each cylinder group 31, 32 is assigned a cylinder-group-specific catalytic converter 38, 39, these converters being designed as ring-type catalytic converters in accordance with the illustrative embodiment in FIG. 12. Exhaust gas which is passed via the first exhaust manifolds 33 and the exhaust turbochargers 51 is passed via a central catalytic converter section 38a, 39a of the ring-type catalytic converters 38 and 39, whereas exhaust gas which is passed via the second exhaust manifolds 34 or, starting from the first exhaust manifolds 33, is diverted past the exhaust turbochargers 51 via bypass valves 40, is passed via outer catalytic converter sections 38b, 39b of the ring-type catalytic converters 38 and 39.

It can be seen from FIG. 14 that each exhaust turbocharger 51 of cylinder groups 31 and 32 to which flow can be directed from the respective first exhaust manifold 33 is once again assigned a bypass valve 40, via which the exhaust gas can be diverted past the respective turbine 37 of exhaust turbocharger 51. The exhaust turbochargers 52, to which flow can be directed from the second exhaust manifolds 34 or via the bypass valves 40, are not assigned any bypass valves but instead are assigned turbine activation valves 44.

According to FIG. 14, exhaust gas leaving the two ring-type catalytic converters 38 and 39 passes in a common tail muffler 41 and, from the tail muffler 41, via exhaust tailpipes 42 into the environment.

FIG. 15 differs from FIG. 14 in the specific embodiment of the cylinder-group-specific catalytic converters 38 and 39 arranged downstream of the exhaust turbochargers 51 and 52. In FIG. 14, these catalytic converters 38 and 39 are embodied as ring-type catalytic converters. In FIG. 15, by contrast, the catalytic converters 38 and 39 are not embodied as ring-type catalytic converters but each exhaust turbocharger 51, 52 of each cylinder group 31, 32 is assigned a dedicated catalytic converter section 38a, 38b, 39a, 39b of the respective catalytic converter 38 or 39.

The common factor in the depicted illustrative embodiments or variants of the internal combustion engines according to aspects of the invention is that the cylinders 20, 20' and 20" thereof have a plurality of outlet valves 21 and 22 for exhaust gas, with at least one first outlet valve 21 of each cylinder 20, 20' or 20" interacting with a first outlet duct 25, which is contoured in the manner of a nozzle, and at least one second outlet valve 22 of each cylinder 20, 20' or 20" interacting with a second outflow duct 26, which is contoured in the manner of a diffuser. The cylinders form at least one cylinder group, with the respective cylinders of the respective cylinder group having two separate exhaust manifolds 33 and 34 in the region of the or of each cylinder group, specifically in such a way that the first outlet ducts 25 of the cylinders of each cylinder group, which outlet ducts are contoured in the manner of nozzles, open into a first exhaust manifold 33, and the second outlet ducts 26 of the respective cylinders, which outlet ducts are contoured in the manner of diffusers, open into a second, separate exhaust manifold 34, with these exhaust manifolds preferably having flow cross sections of different sizes for the exhaust gas, specifically in such a way that the exhaust manifold 33 which interacts with the outlet ducts 25 which are contoured in the manner of nozzles has a relatively small flow cross section and the exhaust manifold 34 which interacts with the outlet ducts 26 which are contoured in the manner of diffusers has a relatively large flow cross section for exhaust gas.

The flow of exhaust gas through the exhaust manifolds 33 and 34 depends on the operating state or operating point of the respective internal combustion engine.

Under part load, in unsteady-state operation and under full load in a lower speed range of the respective internal combustion engine, exhaust gas flows exclusively via the first outlet ducts 25, which are contoured in the manner of nozzles, and hence via the first exhaust manifolds 33 to cylinder-group-specific exhaust catalytic converters.

In full-load operation in a medium or high speed range of the respective internal combustion engine, exhaust gas also flows via the second exhaust manifolds 34 and hence via the second outlet ducts 26, which are contoured in the manner of diffusers, either into a common exhaust turbocharger or into a cylinder-group-specific exhaust turbocharger, depending on the specific embodiment of the internal combustion engine.

Owing to the fact that, at a relatively low load on the internal combustion engine, exhaust gas is directed to exhaust turbochargers via the outlet ducts 25 which are contoured in the manner of nozzles and via the first exhaust manifolds 33 with the relatively small flow cross sections, an increase in the momentum of the exhaust gas, constant-pressure charging in the region of the respective exhaust turbocharger and hence a good response of the latter are ensured in the case of a relatively low load on the internal combustion engine, in which relatively little exhaust gas is formed.

Whenever a large amount of exhaust gas is formed, at full load in a high speed range or medium speed range of the internal combustion engine, exhaust gas is also directed via the second exhaust manifolds 34, into which the outlet ducts 26 which are contoured in the manner of diffusers open, with the outlet ducts 26 which are contoured in the manner of diffusers and the second exhaust manifolds 34 with the relatively large flow cross sections bringing about a reduction in the momentum of the exhaust gas, and constant-pressure charging being provided in the region of the respective exhaust turbocharger, to which exhaust gas is fed via the second exhaust manifolds 34.

List of Reference Signs 20, 20', 20'' cylinder
21 outlet valve
22 outlet valve
23 inlet valve
24 inlet valve
25 outlet duct
26 outlet duct
30, 30', 30'', 30''' internal combustion engine
31 cylinder group
32 cylinder group
33 exhaust manifold
34 exhaust manifold
35 exhaust turbocharger
36 exhaust turbocharger
37 turbine
38 exhaust catalytic converter
38a, 38b catalytic converter section
39 exhaust catalytic converter
39a, 39b catalytic converter section
40 bypass valve
41 tail muffler
42 tailpipe
43 exhaust turbocharger
44 turbine activation valve
45 compressor
46 charge air line
47 check valve
48 exhaust catalytic converter
49 tail muffler
50 tail muffler
51 exhaust catalytic converter
52 exhaust catalytic converter

The invention claimed is:

1. An internal combustion engine comprising:
a plurality of cylinders in at least one cylinder group; and
at least one exhaust turbocharger receiving exhaust gas from the internal combustion engine;
wherein each of the plurality of said cylinders in the at least one cylinder group comprise a first outlet valve and a second outlet valve for exhaust gas to be discharged;
wherein the first outlet valve is assigned a first outlet duct extending outside of one of the cylinders of the plurality of said cylinders that receives exhaust gas from the first outlet valve and opens into a first exhaust pipe which opens into a first common exhaust manifold and is guided in a direction toward to a turbine of the at least one exhaust turbocharger;
wherein the first outlet duct of said each of the plurality of the cylinders in the at least one cylinder group is contoured in the manner of a nozzle;
wherein the second outlet valve is assigned a second outlet duct extending outside of one of the cylinders of the plurality of said cylinders that receives exhaust gas from the second outlet valve and opens into a second exhaust pipe which opens into a second common exhaust manifold and is guided in a direction toward to the turbine of the at least one exhaust turbocharger; and
wherein the second outlet duct of said each of the plurality of the cylinders in the at least one cylinder group is contoured in the manner of a diffuser.

2. The internal combustion engine as claimed in claim 1, wherein the second outlet duct of said each of the plurality of the cylinders in the at least one cylinder group which is contoured in the manner of the diffuser has a widening flow cross section as seen in a direction of flow of the exhaust gas.

3. The internal combustion engine as claimed in claim 1, wherein the first outlet duct of said each of the plurality of the cylinders in the at least one cylinder group which is contoured in the manner of the nozzle has a narrowing flow cross section as seen in a direction of flow of the exhaust gas.

4. The internal combustion engine as claimed in claim 1, wherein each cylinder has two first outlet ducts, which are contoured in the manner of nozzles, and a second outlet duct, which is contoured in the manner of a diffuser.

5. The internal combustion engine as claimed in claim 1, wherein the first common exhaust manifold, into which the first outlet duct of said each of the plurality of said cylinders in the at least one cylinder group which is contoured in the manner of the nozzle opens, has a relatively small flow cross section, and the second common exhaust manifold, into which the second outlet duct of said each of the plurality of said cylinders in the at least one cylinder group which is contoured in the manner of the diffuser opens, has a relatively large flow cross section.

6. The internal combustion engine as claimed in claim 1, wherein the at least one cylinder group of said internal combustion engine includes a first cylinder group and a second cylinder group, and
   wherein the at least one exhaust turbocharger includes a first exhaust turbocharger and a second exhaust turbocharger;
   wherein the first cylinder group is assigned the first exhaust turbocharger and the second cylinder group is assigned the second exhaust turbocharger,
   wherein the first common exhaust manifold of the first cylinder group, into which the first outlet duct of said each of the cylinders in the first cylinder group opens, is contoured in the manner of the nozzle, and the second common exhaust manifold of the first cylinder group, into which the second outlet duct of said each of the cylinders in the first cylinder group opens, is contoured in the manner of the diffuser, the first common exhaust manifold and the second exhaust manifold of the first cylinder group lead the exhaust gas to a first turbine of the first exhaust turbocharger assigned to the first cylinder group, and
   wherein a first common exhaust manifold of the second cylinder group, into which the first outlet duct of each of the cylinders in the second cylinder group opens, is contoured in the manner of the nozzle, and a second common manifold of the second cylinder group, into which the second outlet duct of each of the cylinders in the second cylinder group opens, is contoured in the manner of the diffuser, the first common exhaust manifold and the second common exhaust manifold of the second cylinder group lead the exhaust gas to a second turbine of the second exhaust turbocharger assigned to the second cylinder group.

7. The internal combustion engine as claimed in claim 1, wherein said engine has a first cylinder group and a second cylinder group, each cylinder group being assigned two separate exhaust turbochargers,
   wherein on each of the cylinder groups, a first exhaust manifold of the respective cylinder group, into which the outlet ducts of the respective cylinder group open, which outlet ducts are contoured in the manner of nozzles, leads to a turbine of a first exhaust turbocharger assigned to the respective cylinder group,
   whereas a second exhaust manifold of the respective cylinder group, into which the outlet ducts of the respective cylinder group open, which outlet ducts are contoured in the manner of diffusers, in each case leads to a turbine of a second exhaust turbocharger assigned to the respective cylinder group.

8. The internal combustion engine as claimed in claim 1, wherein said engine has a first cylinder group and a second cylinder group, each cylinder group being assigned a separate exhaust turbocharger and both cylinder groups additionally being assigned a common exhaust turbocharger,
   wherein a first exhaust manifold of the first cylinder group, into which the outlet ducts of the first cylinder group open, which outlet ducts are contoured in the manner of nozzles, leads to a turbine of the separate exhaust turbocharger assigned to the first cylinder group, wherein a first exhaust manifold of the second cylinder group, into which the outlet ducts of the second cylinder group open, which outlet ducts are contoured in the manner of nozzles, leads to a turbine of the separate turbocharger assigned to the second cylinder group, and
   wherein a second exhaust manifold of the first cylinder group, into which the outlet ducts of the first cylinder group open, which outlet ducts are contoured in the manner of diffusers, and a second exhaust manifold of the second cylinder group, into which the outlet ducts of the second cylinder group open, which outlet ducts are contoured in the manner of diffusers, each lead to a turbine of the common exhaust turbocharger.

9. The internal combustion engine as claimed in claim 8, wherein the outlet valves of the cylinders which interact with the outlet ducts which are contoured in the manner of diffusers, or the outlet ducts which are contoured in the manner of diffusers, or the exhaust manifolds into which the outlet ducts which are contoured in the manner of diffusers open are activated or deactivated in accordance with an operating state of the internal combustion engine.

10. The internal combustion engine as claimed in claim 9, wherein the outlet valves which interact with the outlet ducts which are contoured in the manner of diffusers, or the outlet ducts which are contoured in the manner of diffusers, or the exhaust manifolds into which the outlet ducts which are contoured in the manner of diffusers open are activated or deactivated in (a) part-load operation of the internal combustion engine, (b) in unsteady-state operation of the internal combustion engine, or (c) in full-load operation of the internal combustion engine in a lower engine speed range of the engine.

11. The internal combustion engine as claimed in claim 10, wherein a turbine activation valve assigned to the turbine of the common exhaust turbocharger is opened or closed in accordance with the operating state of the internal combustion engine,
   wherein the turbine activation valve is closed in part-load operation of the internal combustion engine or in unsteady-state operation of the internal combustion engine or in full-load operation of the internal combustion engine in a lower engine speed range of the engine, and is opened in full-load operation of the internal combustion engine in a medium or upper engine speed range of the engine.

12. The internal combustion engine as claimed in claim 8, wherein the outlet valves which interact with the outlet ducts which are contoured in the manner of diffusers, or the outlet ducts which are contoured in the manner of diffusers, or the exhaust manifolds into which the outlet ducts which are contoured in the manner of diffusers open are activated or deactivated in full-load operation of the internal combustion engine in a medium or upper engine speed range of the engine.

13. The internal combustion engine as claimed in claim 8, wherein the outlet valves of the cylinders which interact with the outlet ducts which are contoured in the manner of diffusers, or the outlet ducts which are contoured in the manner of diffusers, are activated or deactivated in accordance with the operating state of the internal combustion engine according to an ignition sequence of the cylinders.

* * * * *